United States Patent
Natesan et al.

(10) Patent No.: US 9,438,729 B2
(45) Date of Patent: Sep. 6, 2016

(54) AUTOMATED TESTING OF INTERACTIVE VOICE RESPONSE SYSTEMS

(71) Applicant: Accenture Global Services Limited, Dublin (IE)

(72) Inventors: VijayChandar Natesan, Bangalore (IN); Rajesh Sarangapani, Hyderabad (IN); Surajit Chatterjee, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 170 days.

(21) Appl. No.: 14/460,797

(22) Filed: Aug. 15, 2014

(65) Prior Publication Data

US 2016/0050317 A1    Feb. 18, 2016

(51) Int. Cl.
  *H04M 1/64*   (2006.01)
  *H04M 3/493*  (2006.01)
(52) U.S. Cl.
  CPC .......... *H04M 3/4936* (2013.01); *H04M 3/493* (2013.01)
(58) Field of Classification Search
  CPC .... H04L 43/50; H04L 12/2697; H04M 3/22; H04M 3/30; H04M 1/24
  USPC ...................................................... 379/27.04
  See application file for complete search history.

(56) References Cited

U.S. PATENT DOCUMENTS

| | | | | |
|---|---|---|---|---|
| 5,940,472 A * | 8/1999 | Newman | ............. | H04M 3/2254 379/10.02 |
| 7,224,776 B2 * | 5/2007 | Creamer | ............... | H04M 3/493 379/1.02 |
| 7,734,470 B2 | 6/2010 | Natesan | | |
| 8,009,811 B2 * | 8/2011 | Sharma | ................. | H04M 3/242 370/242 |
| 8,311,833 B2 | 11/2012 | Natesan | | |
| 2002/0076008 A1 * | 6/2002 | Neary | ..................... | H04M 3/24 379/88.01 |
| 2002/0077819 A1 * | 6/2002 | Girardo | ................... | G10L 25/69 704/260 |
| 2007/0140466 A1 * | 6/2007 | Sharma | ................. | H04M 3/493 379/235 |
| 2008/0144786 A1 | 6/2008 | Wang et al. | | |

OTHER PUBLICATIONS

Franz Neeser, "Testing IVR Systems—White Paper", Nexus Telecom AG, CH-8048, Switzerland, May 26, 2005, 15 pages.
GL Communications Inc., "Testing IVR (Interactive Voice Response) Systems", http://www.gl.com/testing-interactive-voice-response-systems.html, Oct. 21, 2012, 4 pages.
Wikipedia, "Interactive voice response", http://en.wikipedia.org/wiki/Interactive_voice_response, Jul. 30, 2014, 8 pages.
Extended European Search Report corresponding to EP 15158833.2-1972, mailed Jan. 20, 2016, 8 pages.

* cited by examiner

*Primary Examiner* — Van D Huynh
(74) *Attorney, Agent, or Firm* — Harrity & Harrity, LLP

(57) ABSTRACT

A device may receive an indication to test a call flow associated with an interactive voice response (IVR) system. The device may identify an input associated with the call flow, and may identify a first response associated with the call flow. The first response may be determined based on providing the input to the IVR system on a previous call. The device may initiate a test call with the IVR system. The test call may be initiated after the previous call, and may cause the input to be provided to the IVR system and a second response to be received from the IVR system. The device may identify the second response, and may compare first audio information, associated with the first response, and second audio information associated with the second response. The device may determine a test result based on the comparison, and may provide the test result.

21 Claims, 11 Drawing Sheets

AUTOMATED TESTING OF INTERACTIVE VOICE RESPONSE SYSTEMS

BACKGROUND

Interactive voice response (IVR) is a technology that allows a computing device to interact with humans through the use of voice and dual-tone multi-frequency (DTMF) tones (e.g., input via a keypad). In telecommunications, IVR allows users to interact with a company's host system via a telephone keypad or by speech recognition, so that the users can service their own inquiries by following the IVR dialogue. IVR systems can respond with prerecorded or dynamically generated audio to further direct users on how to proceed.

SUMMARY

According to some possible implementations, a device may receive an indication to test a call flow associated with an interactive voice response (IVR) system. The device may identify an input associated with the call flow, and may identify a first response associated with the call flow. The first response may be determined based on providing the input to the IVR system on a previous call. The device may initiate a test call with the IVR system. The test call may be initiated after the previous call, and may cause the input to be provided to the IVR system and a second response to be received from the IVR system. The device may identify the second response, and may compare first audio information, associated with the first response, and second audio information associated with the second response. The device may determine a test result based on the comparison, and may provide the test result.

According to some possible implementations, a computer readable medium may store instructions that, when executed by a processor, cause the processor to identify a tester input associated with a call flow to be tested for an interactive voice response (IVR) system. The tester input may include input provided to the IVR system. The instructions may cause the processor to identify a first IVR system response associated with the call flow. The first IVR system response may include a response provided by the IVR system, on a first call, based on the tester input. The instructions may cause the processor to initiate a second call with the IVR system to cause the tester input to be provided to the IVR system. The instructions may cause the processor to identify a second IVR system response provided by the IVR system, on the second call, based on the tester input. The instructions may cause the processor to compare first audio information, associated with the first IVR system response, and second audio information associated with the second IVR system response. The instructions may cause the processor to determine a test result based on comparing the first audio information and the second audio information, and to provide information that identifies the test result.

According to some possible implementations, a method may include identifying, by a device, a tester input to be tested in association with an interactive voice response (IVR) system. The tester input may include input provided to the IVR system on a first call. The method may include identifying, by the device, first audio information associated with a first IVR system response. The first IVR system response may be received from the IVR system, on the first call, based on the tester input. The method may include providing, by the device, the tester input to the IVR system on a second call. The method may include receiving, by the device and from the IVR system, a second IVR system response based on the providing the tester input on the second call. The method may include determining, by the device, second audio information associated with the second IVR system response. The method may include comparing, by the device, the first audio information and the second audio information. The method may include determining, by the device, a test result based on comparing the first audio information and the second audio information, and providing, by the device, information that identifies the test result.

According to some possible implementations, a method may include identifying, by a device, a tester inputs to be tested in association with an interactive voice response (IVR) system. The tester inputs may include inputs provided to the IVR system on a first call. The method may include identifying, by the device, first audio information associated with first IVR system responses. The first IVR system responses may be received from the IVR system, on the first call, based on the tester inputs. The method may include providing, by the device, the tester inputs to the IVR system on a second call. The method may include receiving, by the device and from the IVR system, second IVR system responses based on providing the tester inputs on the second call. The method may include determining, by the device, second audio information associated with the second IVR system responses. The method may include comparing, by the device, the first audio information and the second audio information. The method may include determining, by the device, a confidence score for the IVR system based on comparing the first audio information and the second audio information. The method may include providing, by the device, information that identifies the confidence score for the IVR system.

DETAILED DESCRIPTION

The following detailed description of example implementations refers to the accompanying drawings. The same reference numbers in different drawings may identify the same or similar elements.

A user may interact with an IVR system for self-service of the user's inquiries. For example, the user may interact with the IVR system by providing user inputs, such as voice commands or tones input via a keypad. The IVR system may respond to the user inputs by providing IVR responses, such as information requested by the user or instructions that guide the user's interaction with the IVR system. Before an IVR system is implemented or updated, a tester may test the IVR system to ensure, for example, that the IVR system correctly interprets user input (e.g., tester input), provides correct IVR responses, or the like. However, testing an IVR system may be a manually-intensive process, which may make the testing expensive and error-prone. Further, testing may be limited to portions of a call flow. Implementations described herein assist in automated testing of IVR systems, including validating IVR responses and end-to-end call flows.

Figure 1A:
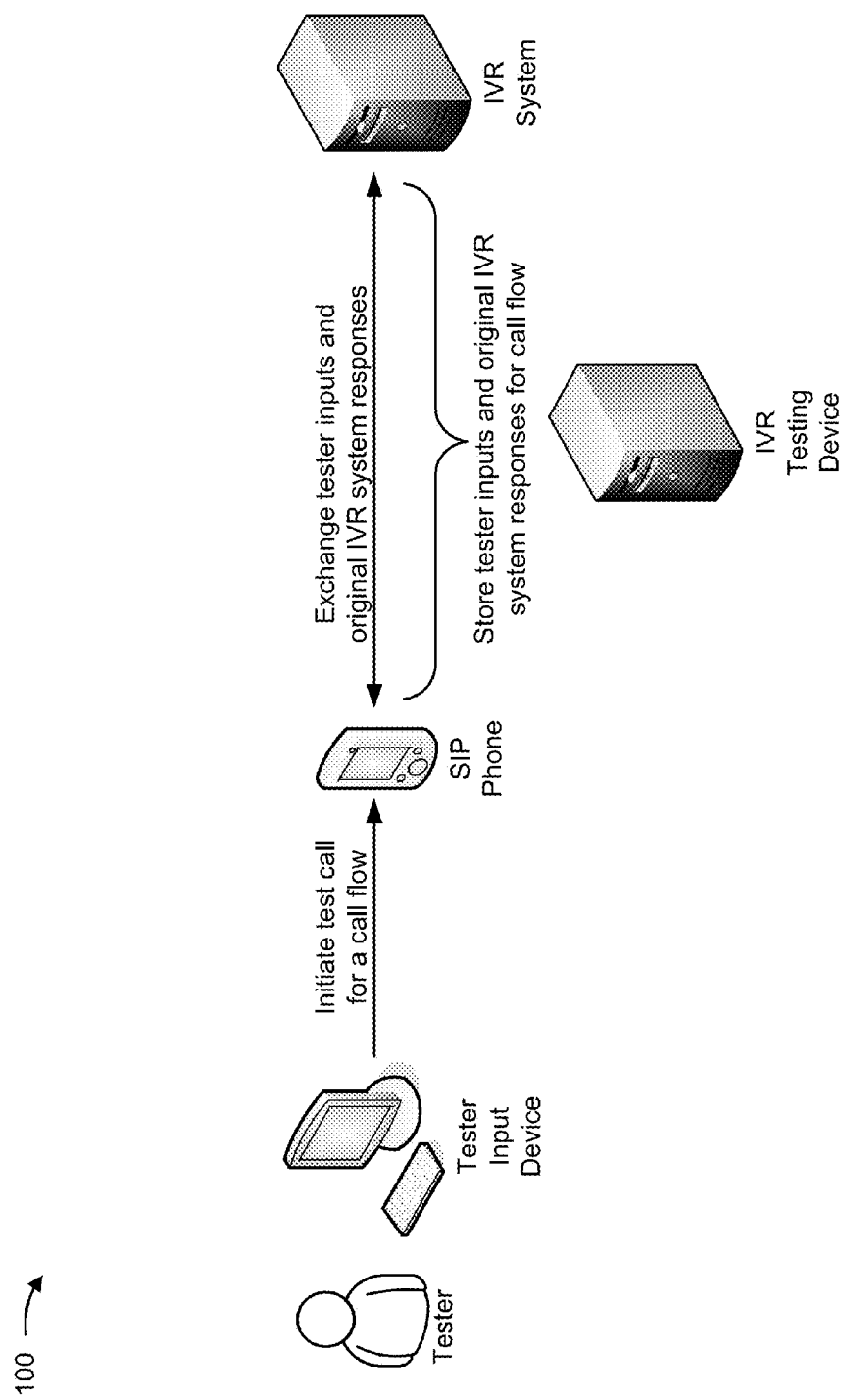
FIGS. 1A and 1B are diagrams of an overview of an example implementation described herein.
Figure 1B:
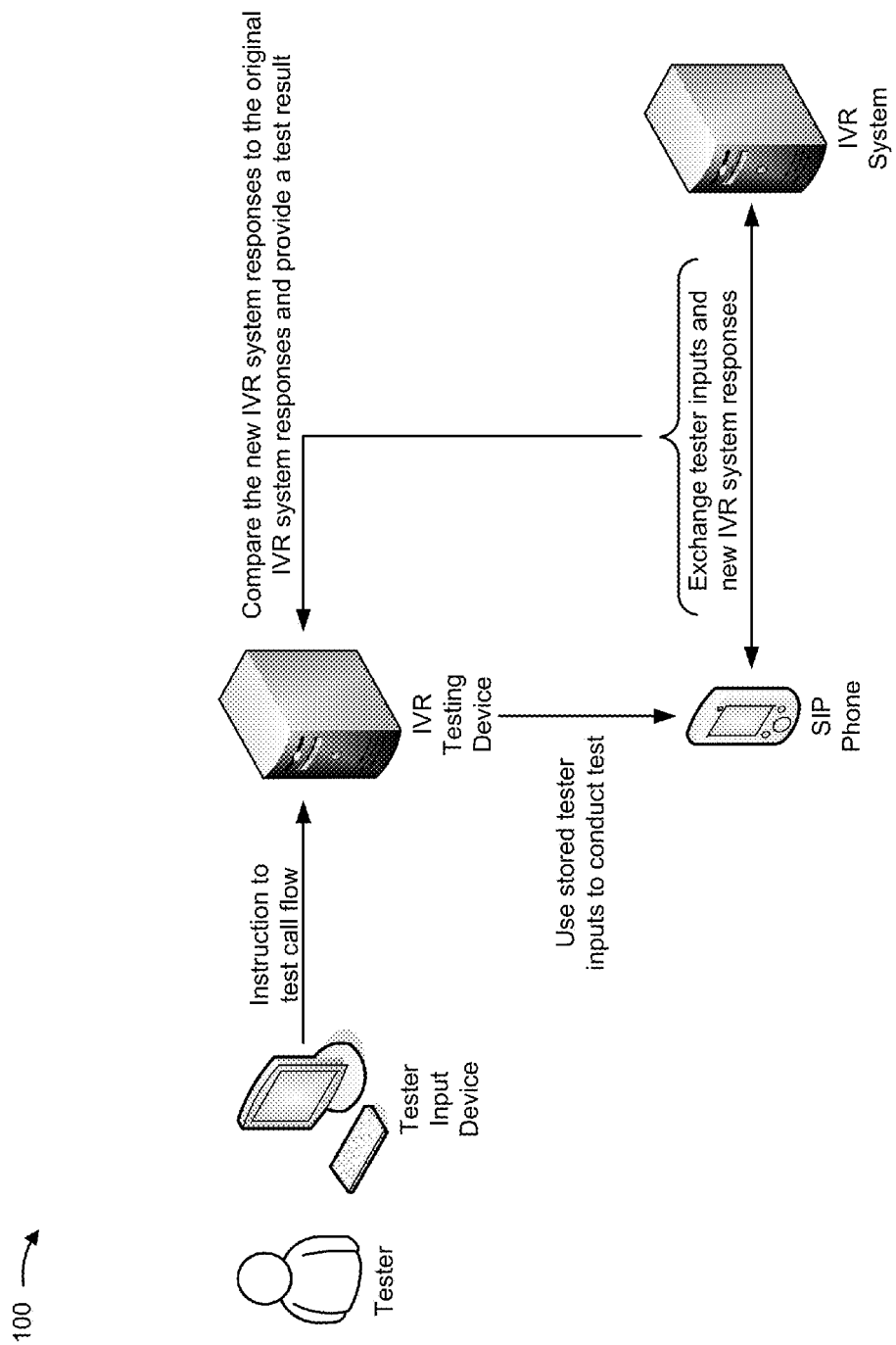

FIGS. 1A and 1B are diagrams of an overview of an example implementation 100 described herein. As shown in FIG. 1A, a tester may interact with a tester input device (e.g., a desktop computer, a laptop computer, a phone, etc.) to initiate a test call for a call flow. A call flow may include a series of tester inputs and IVR system responses to the tester inputs. As further shown, the tester may use a session initiation protocol (SIP) phone (e.g., that uses voice over internet protocol (VoIP) to make and receive calls) to initiate the test call, and to exchange tester inputs and original IVR system responses with an IVR system. For example, the SIP phone may provide tester inputs to the IVR system, and the IVR system may respond to the tester inputs with original IVR system responses. As further shown, an IVR testing device (e.g., a server device, an audio recording device, etc.) may store the tester inputs and the original IVR system responses, for the call flow, to assist with automated testing.

As shown in FIG. 1B, at a later time, the tester may interact with the tester input device to provide instructions to test the call flow. For example, the IVR system may have been updated (e.g., to permit different user inputs, to interpret user inputs in a different manner, to provide different IVR system responses, etc.), and the tester may wish to test the IVR system to ensure that the call flow is still functioning correctly. As further shown, the IVR testing device may receive the instructions, and may use stored tester inputs, associated with the call flow, to conduct the test (e.g., the tester inputs stored as described in connection with FIG. 1A). The IVR testing device may provide the stored tester inputs to the SIP phone, and the SIP phone may exchange tester inputs and new IVR system responses with the IVR system.

As further shown in FIG. 1B, the IVR testing device may monitor the tester inputs and the new IVR system responses, and may compare the new IVR system responses to the original IVR system responses to determine whether the IVR system is responding correctly to the tester inputs. The IVR testing device may generate a test result based on comparing the new IVR system responses and the original IVR system responses (e.g., a result that indicates whether testing passed, a confidence score for the testing, etc.), and may provide the test result (e.g., to the tester input device for display to the tester). In this way, the IVR testing device may assist in automated testing of the IVR system, thereby improving efficiencies, reducing costs, and reducing errors associated with manual testing.

Figure 2:
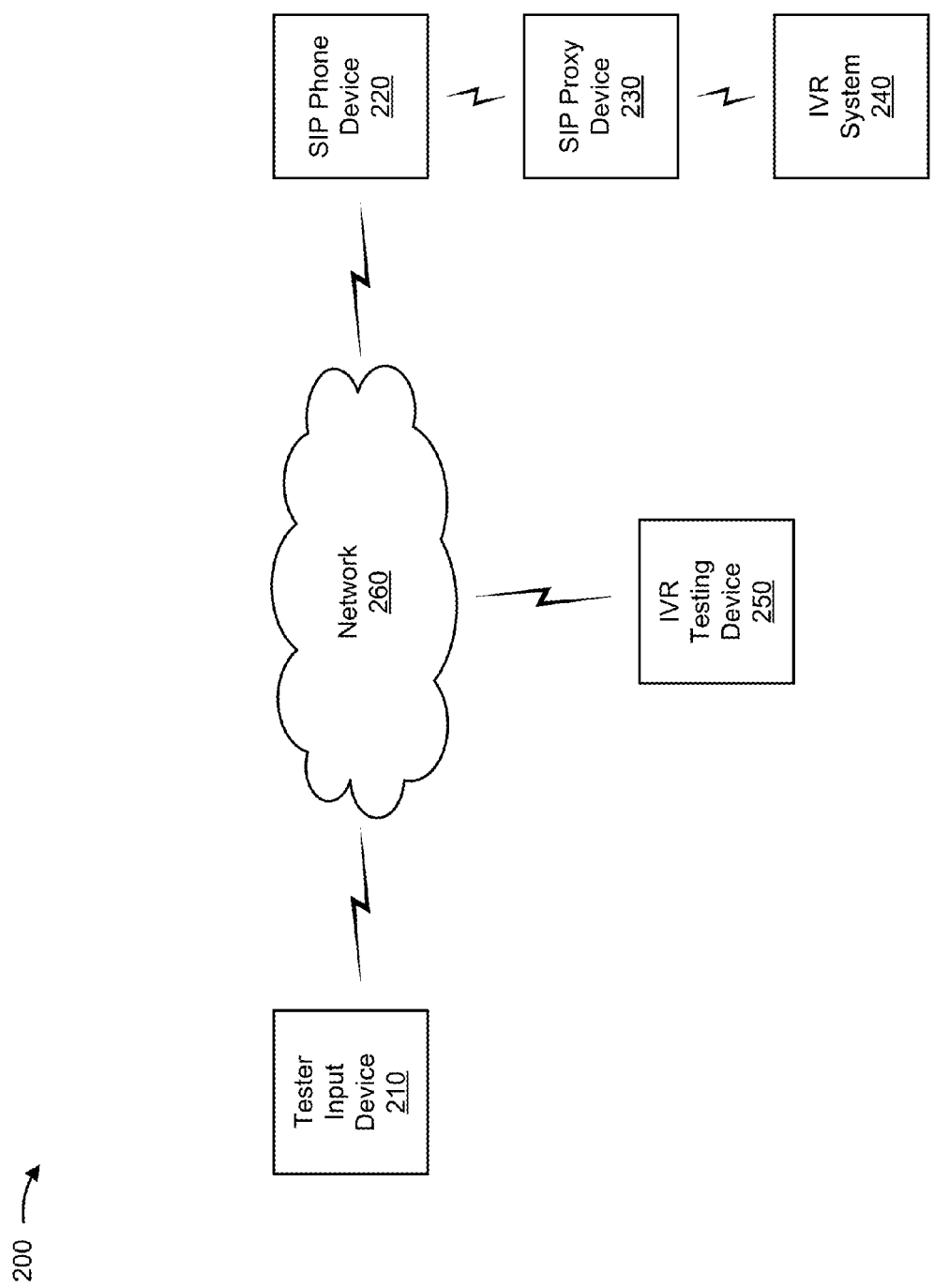
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a tester input device 210, a SIP phone device 220, a SIP proxy device 230, an IVR system 240, an IVR testing device 250, and a network 260. Devices of environment 200 may interconnect via wired connections, wireless connections, or a combination of wired and wireless connections.

Tester input device 210 may include one or more devices capable of receiving, generating, storing, processing, and/or providing IVR testing information (e.g., tester inputs, IVR system responses, a test result determined based on testing an IVR system, information associated with a call flow, etc.). For example, tester input device 210 may include a communications and/or computing device, such as a desktop computer, a laptop computer, a tablet computer, a server device, a phone (e.g., a smart phone, a radiotelephone, an IP phone, etc.), or a similar type of device. In some implementations, tester input device 210 may receive tester input for testing an IVR system, and may provide the tester input to another device of environment 200 (e.g., SIP phone device 220, IVR testing device 250, etc.) to test IVR system 240. Additionally, or alternatively, tester input device 210 may receive a test result associated with testing IVR system 240, and may provide the test result (e.g., for display).

SIP phone device 220 may include one or more devices capable of making and receiving phone calls (e.g., utilizing IP). For example, SIP phone device 220 may include a communications and/or computing device, such as a phone (e.g., an IP phone, a mobile phone, a landline phone, etc.), a desktop computer, a laptop computer, a tablet computer, or a similar type of device. In some implementations, SIP phone device 220 may include a VoIP application (e.g., a softphone) that permits SIP phone device 220 to make and receive phone calls using VoIP (e.g., via SIP). Additionally, or alternatively, SIP phone device 220 may be integrated with another device of environment 200, such as tester input device 210, SIP proxy device 230, and/or IVR testing device 250. SIP phone device 220 may receive instructions for conducting a phone call with IVR system 240 (e.g., a phone number to call, tester inputs to provide, etc.), may conduct the phone call, and may record and/or provide (e.g., to IVR testing device 250) IVR system responses received from IVR system 240. Although some implementations are described herein as using a SIP phone, a landline phone or another type of phone may be used in some implementations.

SIP proxy device 230 may include one or more devices capable of processing phone calls (e.g., SIP phone calls) associated with SIP phone device 220. For example, SIP proxy device 230 may include a communications and/or computing device, such as a server device (e.g., a SIP server, a SIP proxy server, etc.), a phone, or a similar type of device. SIP proxy device 230 may process SIP phone calls between SIP phone device 220 and IVR system 240. For example, SIP proxy device 230 may use SIP to manage call setup, may control call routing, may authorize calling and/or called devices, may enforce call policy, or the like.

IVR system 240 may include one or more devices that host an IVR system for interacting with users (e.g., testers) over a phone call by receiving user input (e.g., tester input) and providing IVR system responses based on the user input. For example, IVR system 240 may include a communications and/or computing device, such as a server device, a phone, a desktop computer, a laptop computer, a tablet computer, or a similar type of device. In some implementations, IVR system 240 may interact with SIP phone device 220 via SIP proxy device 230. IVR system 240 may receive tester input, may interpret the tester input (e.g., according to a programmed algorithm, using voice recognition, using tone recognition, etc.), and may provide an IVR system response based on interpreting the tester input.

IVR testing device 250 may include one or more devices for testing IVR system 240. For example, IVR testing device 250 may include a communications and/or computing device, such as a server device, a phone, a desktop computer, a laptop computer, a tablet computer, or a similar type of device. In some implementations, IVR testing device 250 may monitor tester inputs and/or IVR system responses associated with a call between SIP phone 220 and IVR system 240. Additionally, or alternatively, IVR testing device 250 may compare IVR system responses associated with different calls (e.g., but associated with the same call flow), and may determine a test result based on the comparison. IVR testing device 250 may provide the test result (e.g., for display, to another device for processing, to another device for display, etc.).

Network 260 may include one or more wired and/or wireless networks. For example, network 260 may include a cellular network (e.g., a long term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
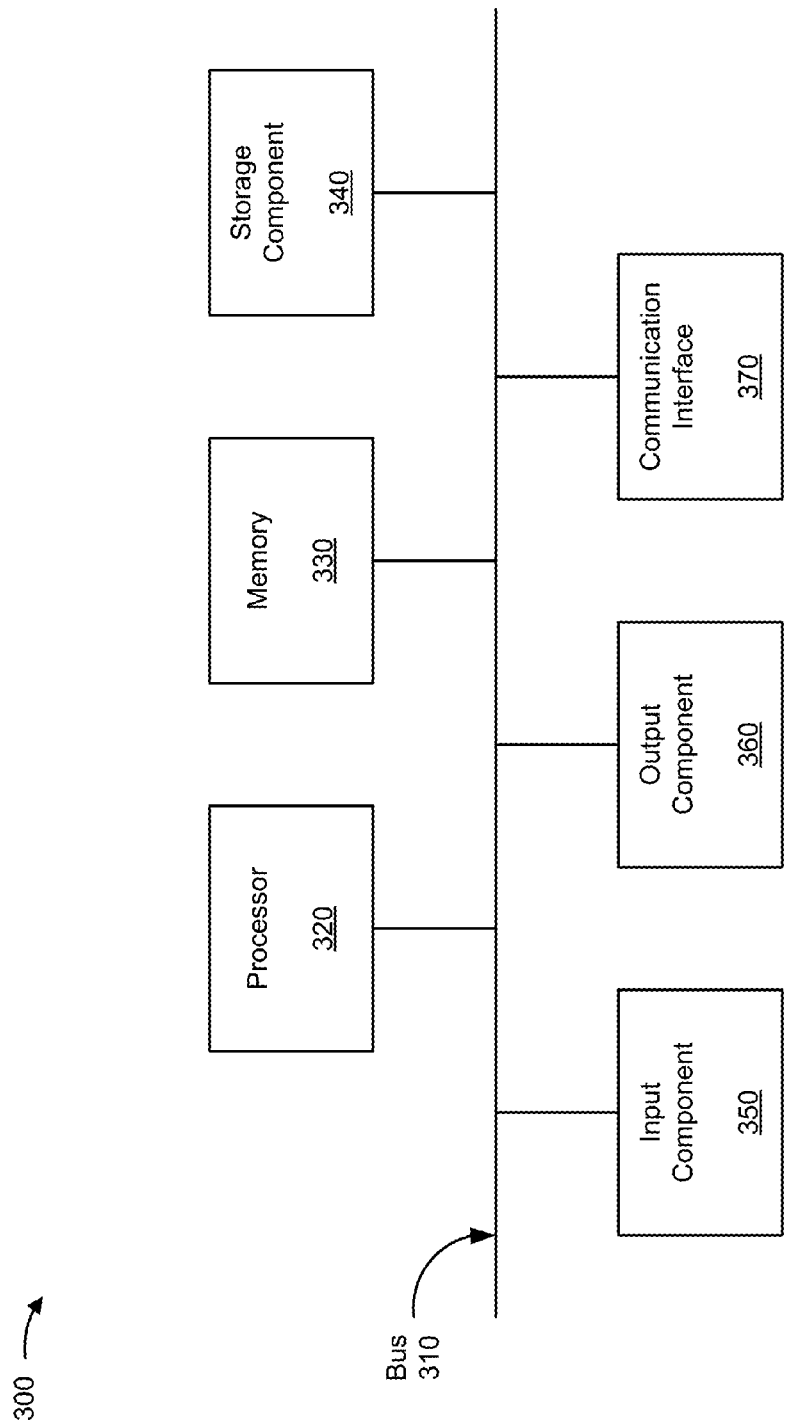
FIG. 3 is a diagram of example components of one or more devices of FIG. 2.

FIG. 3 is a diagram of example components of a device 300. Device 300 may correspond to tester input device 210, SIP phone device 220, SIP proxy device 230, IVR system 240, and/or IVR testing device 250. In some implementations, tester input device 210, SIP phone device 220, SIP proxy device 230, IVR system 240, and/or IVR testing device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
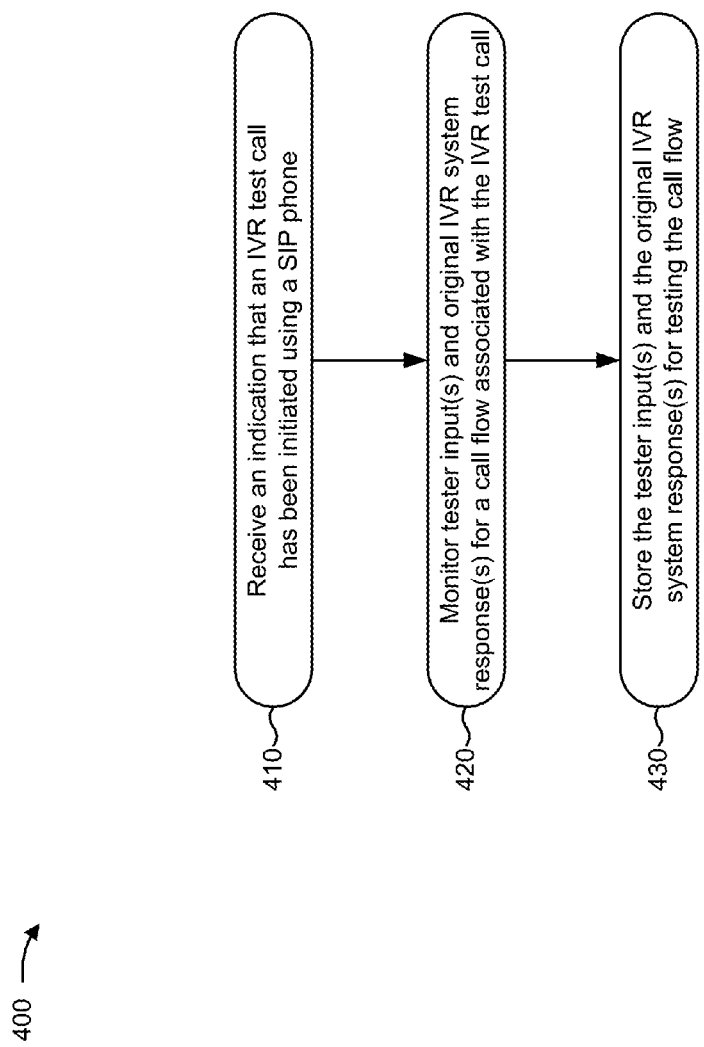
FIG. 4 is a flow chart of an example process for storing tester inputs and original IVR system responses for automated testing of an IVR system.

FIG. 4 is a flow chart of an example process 400 for storing tester inputs and original IVR system responses for automated testing of an IVR system. In some implementations, one or more process blocks of FIG. 4 may be performed by IVR testing device 250. In some implementations, one or more process blocks of FIG. 4 may be performed by another device or a group of devices separate from or including IVR testing device 250, such as tester input device 210, SIP phone device 220, SIP proxy device 230, and/or IVR system 240.

As shown in FIG. 4, process 400 may include receiving an indication that an IVR test call has been initiated using a SIP phone (block 410). For example, a tester may interact with tester input device 210 to initiate an IVR test call (e.g., a SIP call, a VoIP call, etc.) between SIP phone device 220 and IVR system 240 (e.g., via SIP proxy 230). For example, the tester may interact with an IVR testing application to initiate the IVR test call between SIP phone device 220 and IVR system 240 (e.g., by dialing a phone number associated with IVR system 240, by providing information that identifies IVR system 240, etc.). Based on initiating the call, tester input device 210, SIP phone device 220, SIP proxy device 230, and/or IVR system 240 may provide an indication, to IVR testing device 250, that the IVR test call has been initiated.

As further shown in FIG. 4, process 400 may include monitoring tester input(s) and original IVR system response(s) for a call flow associated with the IVR test call (block 420). For example, IVR testing device 250 may monitor tester inputs provided by SIP phone 220 to IVR system 240, and may monitor IVR system responses provided by IVR system 240 to SIP phone 220. In some implementations, IVR testing device 240 may be connected on the IVR test call, and may monitor the tester inputs and the IVR system responses by, for example, recording audio associated with the tester inputs and/or the IVR system responses, determining information that identifies the tester inputs and/or the IVR system responses, or the like. Additionally, or alternatively, SIP phone device 220, SIP proxy device 230, and/or IVR system 240 may record audio and/or may determine information associated with the tester inputs and/or the IVR system responses, and may provide the audio and/or the information to IVR testing device 250.

A tester input may include information and/or an input provided by SIP phone 220 to IVR system 240 (e.g., based on a tester interaction with SIP phone 220 and/or tester input device 210). For example, the tester input may include information that identifies a keypad button (e.g., a keypad button pressed or selected by the tester, a tone that identifies a keypad button, etc.), a voice input (e.g., audio of a voice input, information that identifies an IVR menu option associated with voice input, etc.), or the like.

An IVR system response may include information provided by IVR system 240 to SIP phone 220. For example, the IVR system response may include audio of an IVR system response, information that identifies a menu option associated with the IVR system response (e.g., a menu item determined based on the tester input), or the like. IVR system 240 may receive the tester input, may analyze the tester input to determine an IVR system response to be provided to SIP phone 220, and may provide the IVR system response to SIP phone 220. In some implementations, multiple different tester inputs may result in the same IVR system response (e.g., pressing "one" on a keypad, speaking "one" into a phone, etc.). As used herein, the terms "original IVR system response" and "new IVR system response" may be used to distinguish between a new IVR system response being tested and an original IVR system response against which the new IVR system response is to be tested.

A series of tester inputs and IVR system responses to the tester inputs may represent a call flow. A call flow may be associated with a particular desired outcome, such as checking a caller's account balance, purchasing an item, making a payment, directing the caller to a particular customer service agent, or the like. In some implementations, a call flow identifier (e.g., a call flow name, a sequence of characters that identifies a call flow, etc.) may be used to identify a call flow, and may be associated with a set of tester inputs and/or IVR system responses. In some implementations, IVR testing device 250 may receive a call flow identifier (e.g., based on information received from another device).

For example, IVR testing device 250 may receive a call flow identifier from tester input device 210 (e.g., based on input provided by a tester).

As further shown in FIG. 4, process 400 may include storing the tester input(s) and the original IVR system response(s) for testing the call flow (block 430). For example, IVR testing device 250 may store the tester inputs and the original IVR system responses in a data structure (e.g., local to or remote from IVR testing device 250). In some implementations, IVR testing device 250 may store a relationship between a call flow identifier for a call flow (e.g., received from tester input device 210), a set of tester inputs associated with the call flow (e.g., monitored by IVR testing device 250), a set of IVR system responses associated with the call flow (e.g., monitored by IVR testing device 250), and an ordered sequence of the set of tester inputs and the set of IVR system responses (e.g., monitored by IVR testing device 250) that represents a correct call flow against which other call flows may be tested.

In this way, a tester may select a call flow to be tested (e.g., using a call flow identifier), and IVR testing device 250 may use the stored information (e.g., the test inputs, the original IVR system responses, the ordered sequence, etc.) to test the call flow, as described in more detail elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
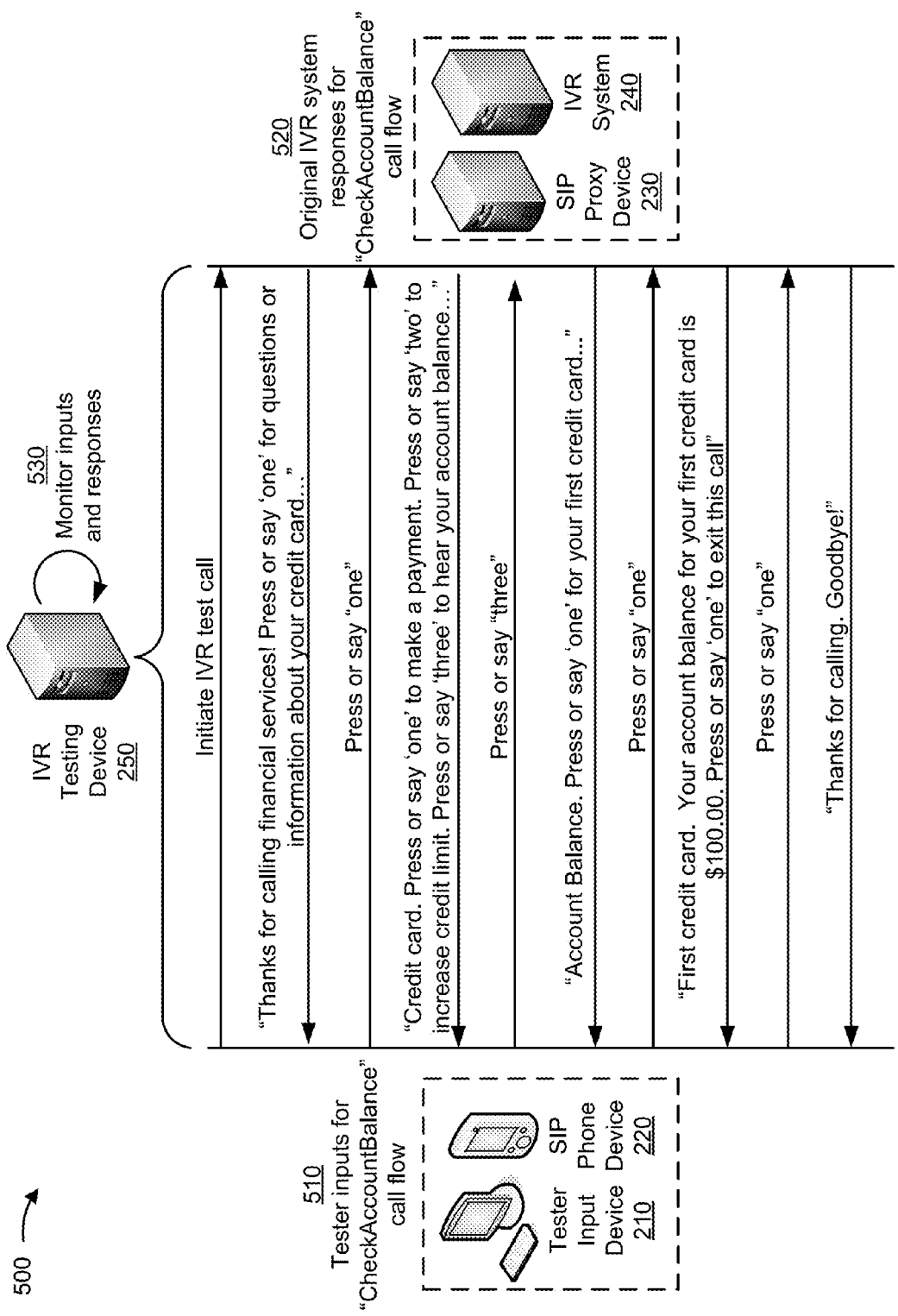
FIGS. 5A and 5B are diagrams of an example implementation relating to the example process shown in FIG. 4.
Figure 5B:
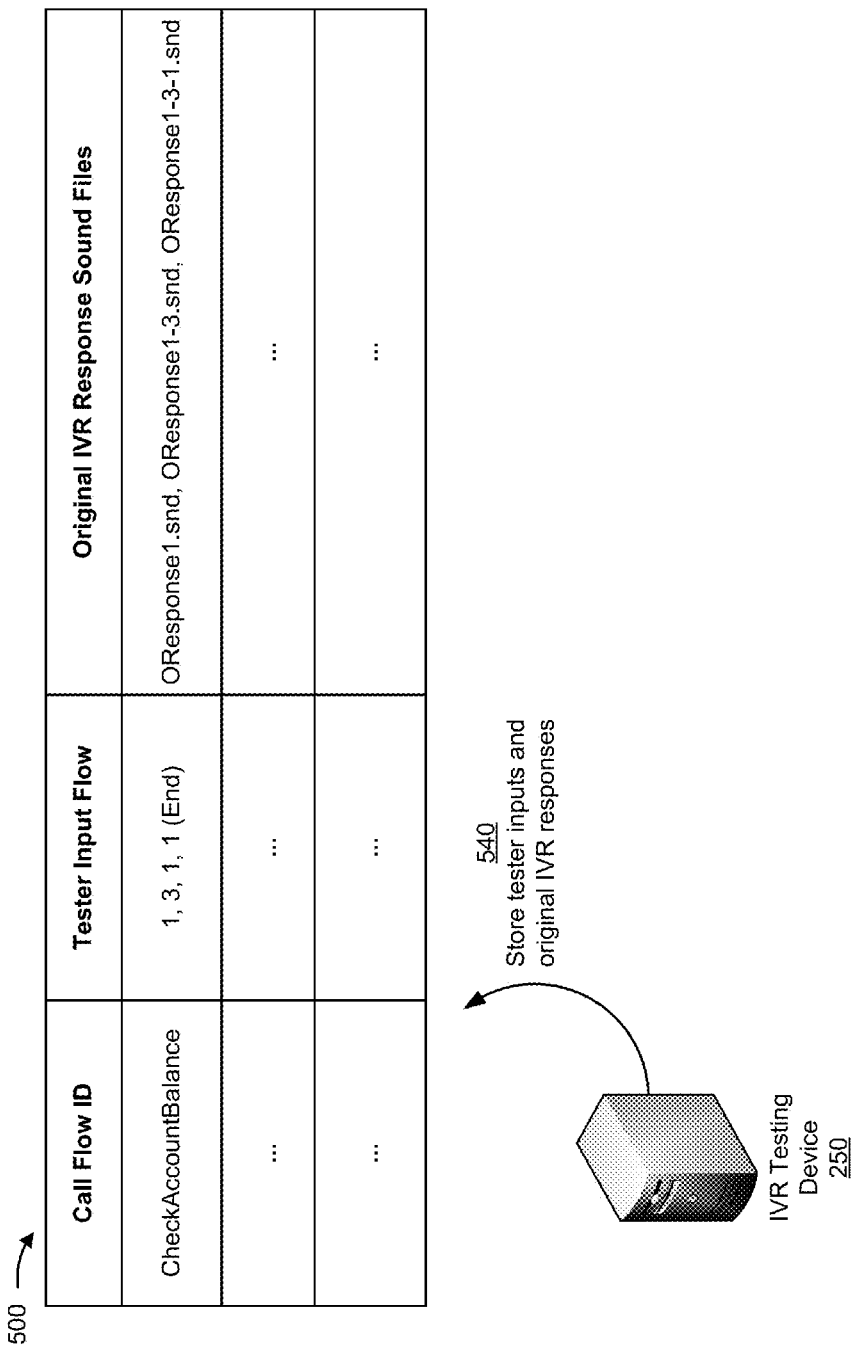

FIGS. 5A and 5B are diagrams of an example implementation 500 relating to example process 400 shown in FIG. 4. FIGS. 5A and 5B show an example of storing tester inputs and original IVR system responses for automated testing of an IVR system.

As shown in FIG. 5A, and by reference number 510, assume that a tester provides, via tester input device 210 and SIP phone 220, a series of tester inputs for a call flow identified as "CheckAccountBalance." As shown by reference number 520, assume that IVR system 240 receives and analyzes the series of tester inputs (e.g., via SIP proxy 230), and provides an original IVR system response, for the "CheckAccountBalance" call flow, in response to each tester input. As shown by reference number 530, assume that IVR testing device 250 monitors the tester inputs and the original IVR system responses.

As an example, and as shown, assume that the call flow begins when SIP phone 220 initiates the IVR test call with IVR system 240. Based on initiating the call, IVR system 240 plays a message, shown as "Thanks for calling financial services! Press or say 'one' for questions or information about your credit card." Assume that the tester provides input by pressing or saying "one," and SIP phone 220 provides this tester input to IVR system 240. Based on the tester input, assume that IVR system 240 plays another message, shown as "Credit Card. Press or say 'one' to make a payment. Press or say 'two' to increase credit limit. Press or say 'three' to hear your account balance." Assume that the tester provides input by pressing or saying "three," and SIP phone 220 provides this tester input to IVR system 240. Based on the tester input, assume that IVR system 240 plays another message, shown as "Account Balance. Press or say 'one' for your first credit card." Assume that the tester provides input by pressing or saying "one," and SIP phone 220 provides this tester input to IVR system 240. Based on the tester input, assume that IVR system 240 plays another message, shown as "First credit card. Your account balance for your first credit card is $100.00. Press or say 'one' to exit this call." Assume that the tester provides input by pressing or saying "one," and SIP phone 220 provides this tester input to IVR system 240. Based on the tester input, assume that IVR system 240 plays another message, shown as "Thanks for calling. Goodbye!"

As shown in FIG. 5B, and by reference number 540, assume that IVR testing device 250 stores the tester inputs and the original IVR responses, monitored as shown in FIG. 5A. For example, IVR testing device 250 stores a call flow identifier (ID), shown as "CheckAccountBalance," and stores information that identifies a tester input flow (e.g., a series of inputs provided by SIP phone 220), shown as "1, 3, 1, End" (e.g., because the first tester input was "one," the second tester input was "three," and third tester input was "one," and the fourth tester input, "one," caused the call to end). As further shown, IVR testing device 250 stores sound files for the original IVR responses (e.g., recorded audio of the original IVR responses). IVR testing device 250 may use this stored information to test call flows, as described in more detail elsewhere herein.

As indicated above, FIGS. 5A and 5B are provided merely as an example. Other examples are possible and may differ from what was described with regard to FIGS. 5A and 5B.

Figure 6:
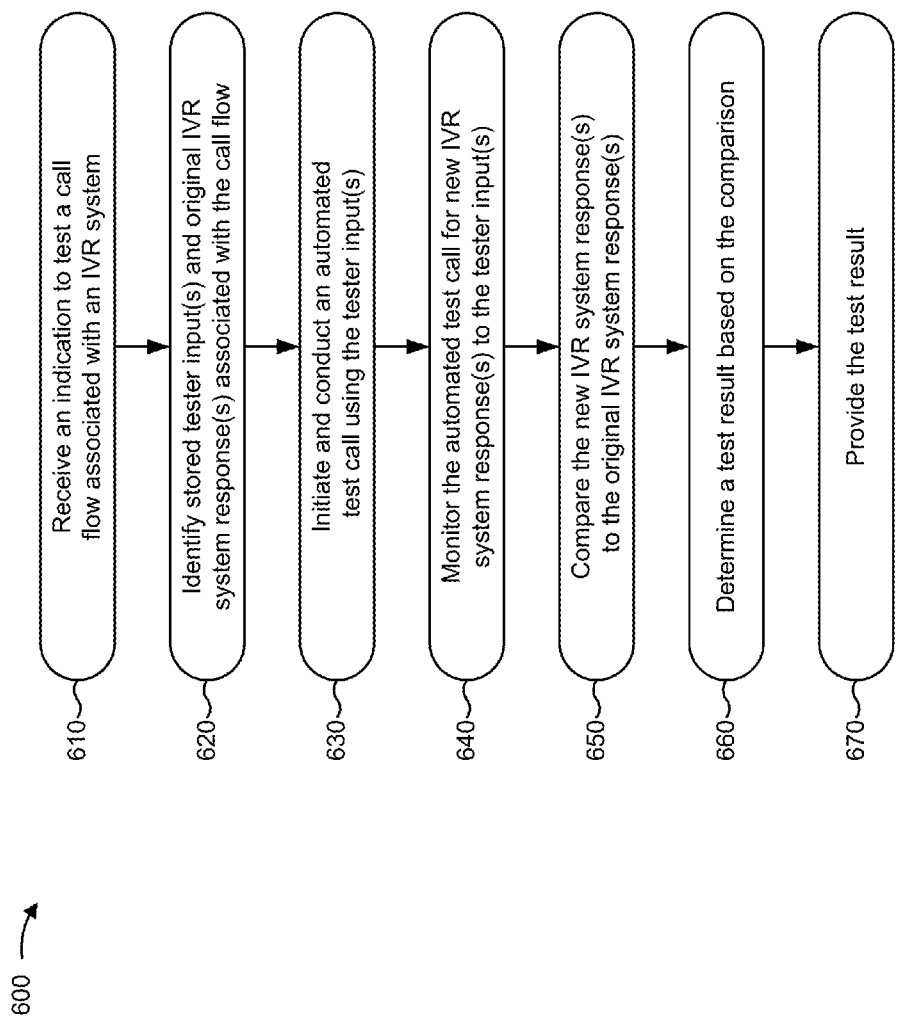
FIG. 6 is a flow chart of an example process for performing automated testing of an IVR system.

FIG. 6 is a flow chart of an example process 600 for performing automated testing of an IVR system. In some implementations, one or more process blocks of FIG. 6 may be performed by IVR testing device 250. In some implementations, one or more process blocks of FIG. 6 may be performed by another device or a group of devices separate from or including IVR testing device 250, such as tester input device 210, SIP phone device 220, SIP proxy device 230, and/or IVR system 240.

As shown in FIG. 6, process 600 may include receiving an indication to test a call flow associated with an IVR system (block 610). For example, a tester may interact with tester input device 210 to provide an indication that a call flow is to be tested. As an example, a tester may want to test IVR system 240 before implementing IVR system 240. As another example, the tester may want to test IVR system 240 based on an update to IVR system 240 (e.g., a software update, an update to an algorithm for interpreting tester inputs, etc.). In some implementations, the tester may provide input that identifies a call flow to be tested, such as by inputting a call flow identifier (e.g., using tester input device 210). Additionally, or alternatively, the tester may provide input that identifies a set of tester inputs and/or a set of original IVR system responses (e.g., original IVR system response audio files) to be tested. Based on receiving the input from the tester, tester input device 210 may provide an indication, to IVR testing device 250, to test the call flow.

As further shown in FIG. 6, process 600 may include identifying stored tester input(s) and original IVR system response(s) associated with the call flow (block 620). For example, IVR testing device 250 may identify stored tester inputs and original IVR system responses associated with a call flow to be tested. In some implementations, IVR testing device 250 may receive (e.g., from tester input device 210) a call flow identifier, and may use a data structure to identify tester inputs and original IVR system responses associated with the call flow identifier. Additionally, or alternatively, IVR testing device 250 may determine (e.g., based on stored information) an ordered sequence for the tester inputs and/or the original IVR system responses. In some implementations, a tester input for a particular call flow step may be associated with different inputs that result in the same IVR system response (e.g., an indication that button "one" was pressed, a sound file with a recording of a voice speaking "one," multiple sound files with different accents and/or voices, etc.).

As further shown in FIG. 6, process 600 may include initiating and conducting an automated test call using the tester input(s) (block 630). For example, IVR testing device 250 may initiate an automated test call (e.g., a SIP call, a VoIP call, etc.) between SIP phone device 220 and IVR system 240 (e.g., via SIP proxy 230). For example, IVR testing device 250 may provide instructions to SIP phone device 220 to initiate the automated test call between SIP phone device 220 and IVR system 240 (e.g., by dialing a phone number associated with IVR system 240, by providing information that identifies IVR system 240, etc.).

Additionally, or alternatively, IVR testing device 250 may provide instructions, to SIP phone device 220, for conducting the automated test call. For example, IVR testing device 250 may provide information that identifies the tester inputs (e.g., a button to press, a sound file to be played, etc.), and SIP phone device 220 may provide the tester inputs, via the automated test call, to IVR system 240. In this way, the automated test call may be conducted without requiring the tester to input additional tester inputs (e.g., after inputting initial tester inputs to determine original IVR system responses, as described herein in connection with FIG. 4).

As further shown in FIG. 6, process 600 may include monitoring the automated test call for new IVR system responses to the tester inputs (block 640). For example, IVR testing device 250 may monitor new IVR system responses received from IVR system 240 in response to the tester inputs provided to IVR system 240. In some implementations, IVR testing device 250 may be connected on the automated test call, and may monitor the new IVR system responses by, for example, recording audio associated with the new IVR system responses, determining information that identifies the new IVR system responses, or the like. Additionally, or alternatively, SIP phone device 220, SIP proxy device 230, and/or IVR system 240 may record audio and/or may determine information associated with the IVR system responses, and may provide the audio and/or the information to IVR testing device 250.

Additionally, or alternatively, IVR testing device 250 may determine a relationship between a provided tester input and a new IVR system response received based on the provided tester input. IVR testing device 250 may continue to monitor tester inputs and/or new IVR system responses until the call flow is complete (e.g., until all tester inputs have been provided to IVR system 240 and all IVR system responses have been received, until a call ends, etc.). IVR testing device 250 may store a relationship between a call flow identifier, a set of tester inputs, and a set of new IVR system responses (e.g., corresponding to each tester input). In this way, IVR testing device 250 may test IVR system responses for multiple steps of a call flow, associated with different tester inputs in a series of tester inputs. As used herein, the term "new IVR system responses" may refer to IVR system responses being tested (e.g., against "original IVR system responses," determined as described herein in connection with FIG. 4).

As further shown in FIG. 6, process 600 may include comparing the new IVR system responses to the original IVR system responses (block 650), and determining a test result based on the comparison (block 660). For example, IVR testing device 250 may compare information associated with the new IVR system responses and information associated with the original IVR system responses. In some implementations, IVR testing device 250 may make this comparison after the call flow has ended.

IVR testing device 250 may make the comparison by comparing audio information (e.g., stored in sound files) associated with the new IVR system responses and the original IVR system responses, in some implementations. For example, IVR testing device 250 may generate an acoustic fingerprint for a new IVR system response and for an original IVR system response, and may compare the acoustic fingerprints to quantify a difference between the new IVR system response and the original IVR system response. IVR testing device 250 may determine a test result based on the quantified difference. For example, the test result may indicate a degree to which the acoustic fingerprints match (e.g., a percentage, such as a 30% match, an 80% match, etc.), a degree to which the acoustic fingerprints are different (e.g., a percentage, such as a 25% difference, a 90% difference, etc.), or the like. In some implementations, the test result may be represented as a confidence score (e.g., based on the matching).

In some implementations, the test result may indicate whether the testing passed or failed. For example, the test result may indicate whether the testing passed or failed for a particular call flow step (e.g., an IVR system response to a tester input) and/or whether the testing passed or failed for the entire call flow. In some implementations, IVR testing device 250 may compare a quantified test result (e.g., a quantified difference between IVR system responses, a degree to which IVR system responses match, a degree to which IVR system responses do not match, a confidence score, etc.) to a threshold. If the quantified test result satisfies the threshold, then IVR testing device 250 may determine that the testing passed. If the quantified test result does not satisfy the threshold, then IVR testing device 250 may determine that the testing failed.

As further shown in FIG. 6, process 600 may include providing the test result (block 670). For example, IVR testing device 250 may provide the test result for storage, may provide the test result to another device (e.g., tester input device 210), may provide the test result for display, or the like. In some implementations, IVR testing device 250 may provide the test result to tester input device 210 for display on a user interface.

A user interface that displays test results may display, for example, information associated with a tested call flow, such as tester inputs tested for the call flow, original IVR system responses associated with the call flow, new IVR system responses determined based on testing the call flow using the tester inputs, a test result associated with testing the call flow, or the like. For example, the user interface may provide information that identifies a series of tester inputs associated with the call flow. For a particular tester input, the user interface may provide an input mechanism that permits a user to provide input to cause tester input device 210 to play an audio file that stores an original IVR system response associated with the particular tester input. Additionally, or alternatively, the user interface may provide an input mechanism that permits a user to provide input to cause tester input device 210 to play an audio file that stores a new IVR system response associated with the particular tester input. Additionally, or alternatively, the user interface may provide a test result for the particular call flow step (e.g., associated with the tester input), such as a test status (e.g., pass or fail), a confidence score, or the like.

In this way, IVR testing device 250 may perform automated testing of IVR system 240, which may result in more accurate and less expensive testing. Furthermore, the user may be provided with a user interface for analyzing test results of the automated testing before a new IVR system 240 is implemented or before updates to IVR system 240 are implemented.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
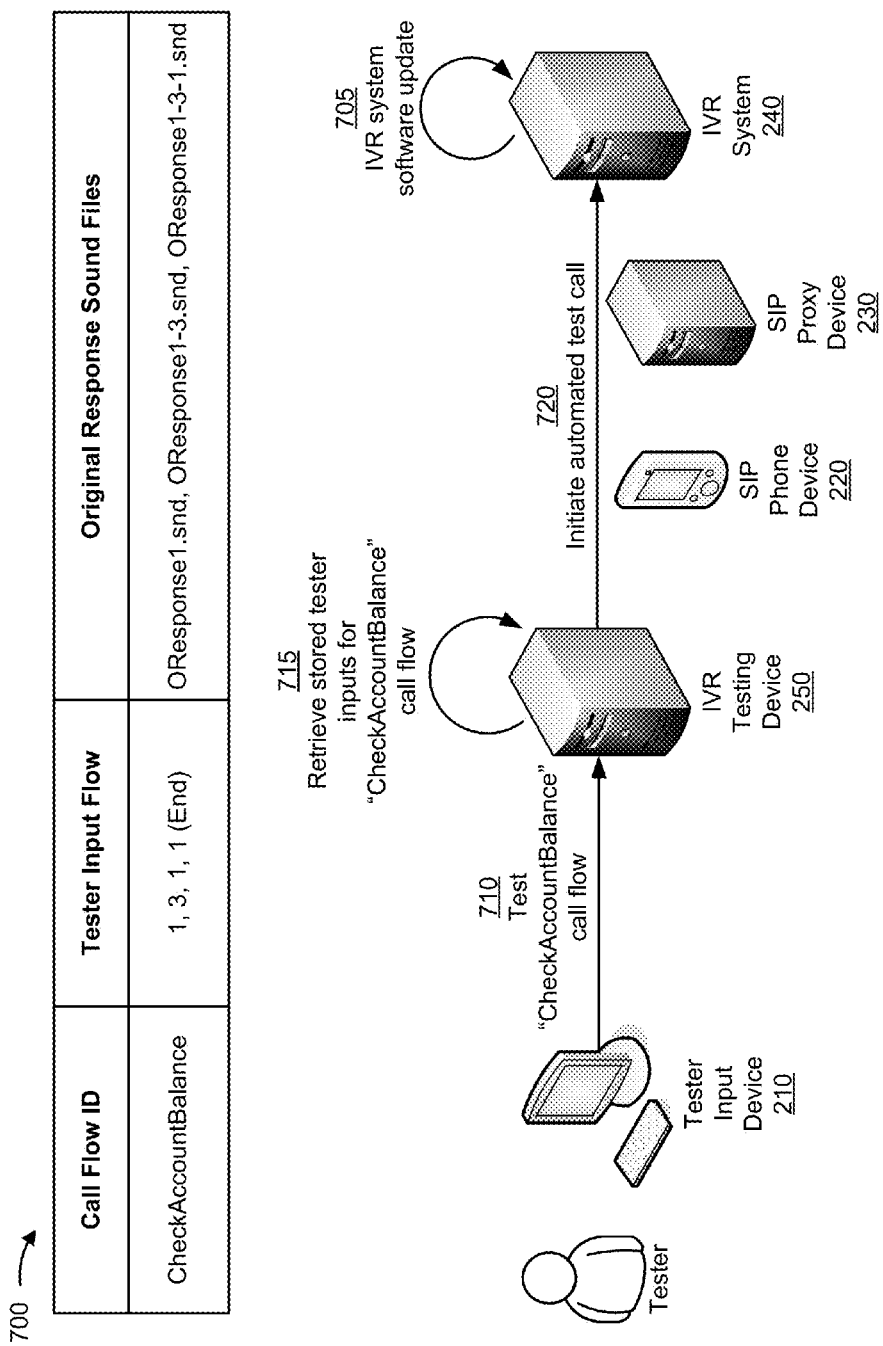
FIGS. 7A-7C are diagrams of an example implementation relating to the example process shown in FIG. 6.
Figure 7B:
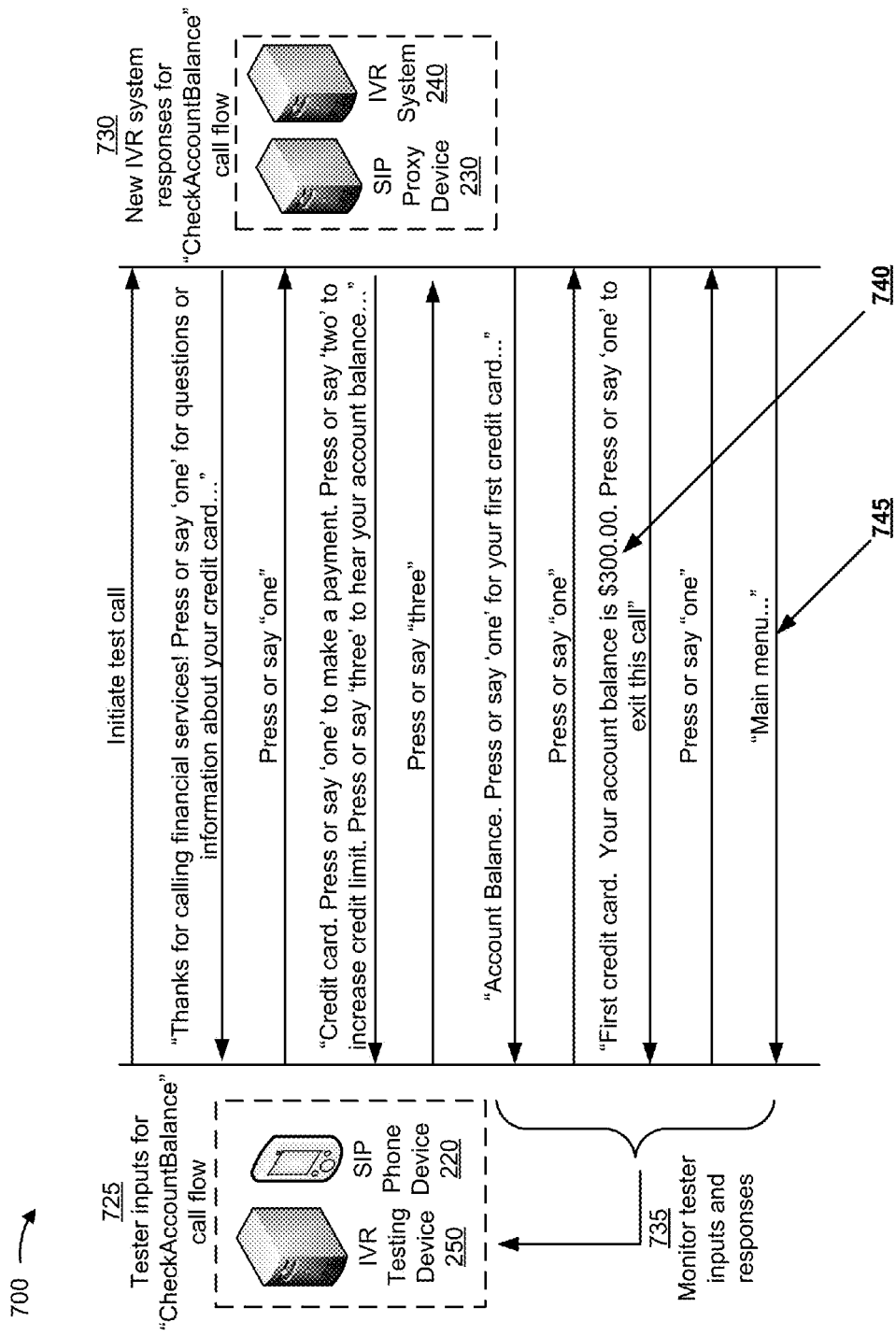
Figure 7C:
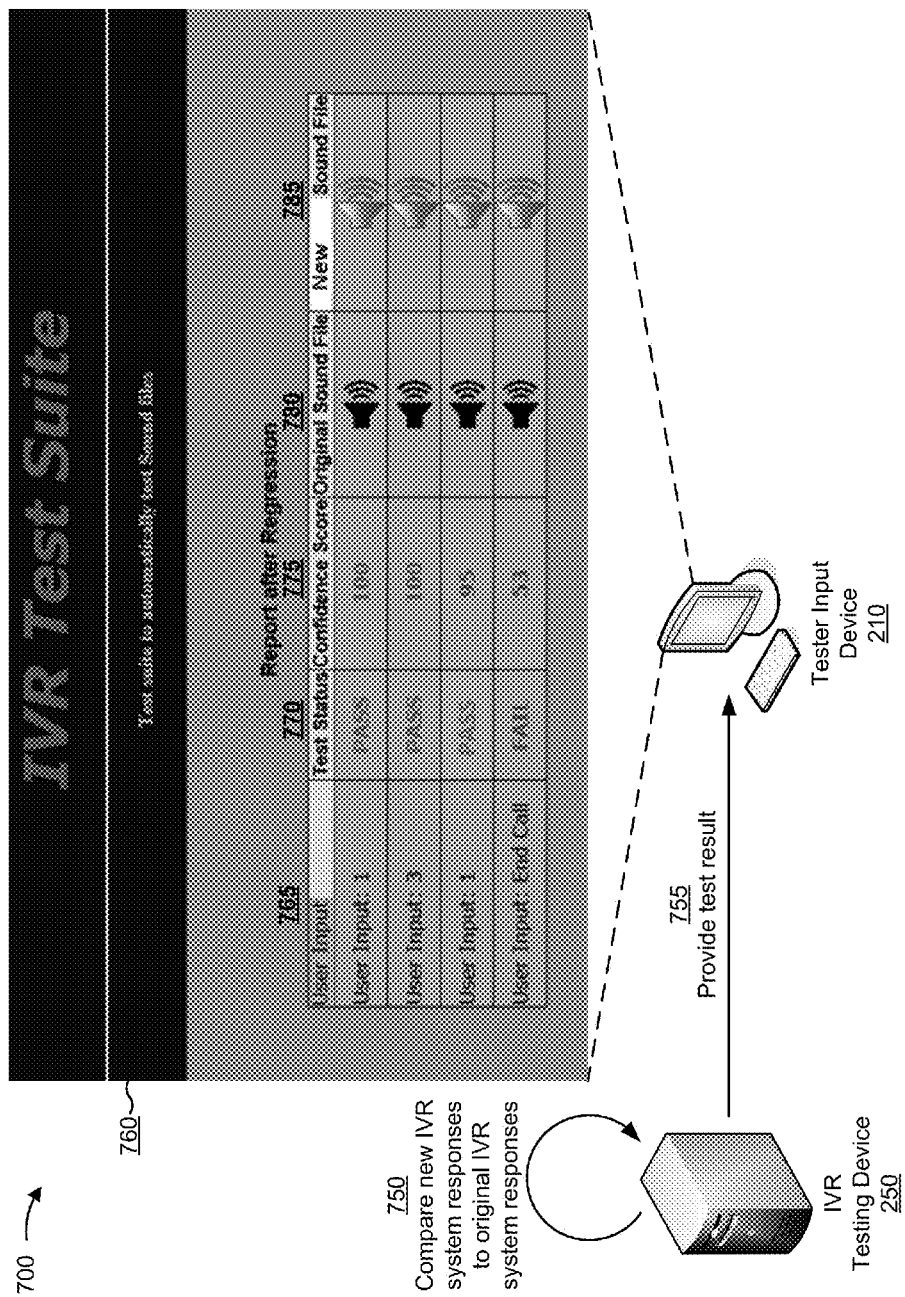

FIGS. 7A-7C are diagrams of an example implementation 700 relating to example process 600 shown in FIG. 6. FIGS. 7A-7C show an example of performing automated testing of an IVR system.

As shown in FIG. 7A, and by reference number 705, assume that IVR system 240 is updated with a software update. Further, assume that a tester wants to test the updated IVR system 240. As shown by reference number 710, assume that the tester provides input, to tester device 210, to test the "CheckAccountBalance" call flow, and that tester input device 210 provides an indication, to IVR testing device 250, to test this call flow. As shown by reference number 715, IVR testing device 250 retrieves stored tester inputs for the "CheckAccountBalance" call flow. For example, IVR testing device 250 determines that testing this call flow involves a series of tester inputs identified as 1, 3, 1, and 1 (which ends the call). As shown by reference number 720, assume that IVR testing device 250 initiates an automated test call, with IVR system 240, using SIP phone device 220 and SIP proxy device 230, to test the "CheckAccountBalance" call flow.

As shown in FIG. 7B, and by reference number 725, assume that IVR testing device 250 provides, via SIP phone 220, the series of tester inputs for the "CheckAccountBalance" call flow. As shown by reference number 730, assume that IVR system 240 receives and analyzes the series of tester inputs (e.g., via SIP proxy 230), and provides a new IVR system response, for the "CheckAccountBalance" call flow, in response to each tester input. As shown by reference number 735, assume that IVR testing device 250 monitors the tester inputs and the new IVR system responses.

As an example, and as shown, assume that the call flow begins when SIP phone 220 initiates the IVR test call with IVR system 240. Based on initiating the call, IVR system 240 plays a message, shown as "Thanks for calling financial services! Press or say 'one' for questions or information about your credit card." Assume that the tester provides input by pressing or saying "one," and SIP phone 220 provides this tester input to IVR system 240. Based on the tester input, assume that IVR system 240 plays another message, shown as "Credit Card. Press or say 'one' to make a payment. Press or say 'two' to increase credit limit. Press or say 'three' to hear your account balance." Assume that the tester provides input by pressing or saying "three," and SIP phone 220 provides this tester input to IVR system 240. Based on the tester input, assume that IVR system 240 plays another message, shown as "Account Balance. Press or say 'one' for your first credit card." Assume that the tester provides input by pressing or saying "one," and SIP phone 220 provides this tester input to IVR system 240. Based on the tester input, assume that IVR system 240 plays another message, shown as "First credit card. Your account balance for your first credit card is $300.00. Press or say 'one' to exit this call." Assume that the tester provides input by pressing or saying "one," and SIP phone 220 provides this tester input to IVR system 240. Based on the tester input, assume that IVR system 240 plays another message, shown as "Main Menu."

As shown by reference number 740, the new IVR response of "First credit card. Your account balance for your first credit card is $300.00. Press or say 'one' to exit this call" is different from the original IVR response of "First credit card. Your account balance for your first credit card is $100.00. Press or say 'one' to exit this call" (e.g., because the value $100.00 in the original IVR response has changed to $300.00 in the new IVR response). As shown by reference number 745, the new IVR system response of "Main menu" is different from the original IVR system response of "Thanks for calling. Goodbye!"

As shown in FIG. 7C, and by reference number 750, IVR testing device 250 compares the new IVR system responses to the original IVR system responses to determine a test result. As shown by reference number 755, IVR testing device 250 provides the test result to tester input device 210. As shown by reference number 760, testing input device 210 provides a user interface for displaying the test result.

As shown by reference number 765, the user interface provides information associated with each tester input, identified as "User Input: 1," "User Input: 3," "User Input: 1" and "User Input: End Call" (e.g., by pressing 1 a final time). As shown by reference numbers 770 and 775, the user interface may provide a test result and a confidence score for each tester input. The test status may indicate whether testing passed or failed for a particular tester input, which may be determined based on a comparison between the original IVR system response received in response to a tester input and the new IVR system response received in response to the tester input. The confidence score may indicate a degree of confidence associated with the test status.

In some implementations, the confidence score may indicate a percentage of matching audio (e.g., a matching audio fingerprint) between the new IVR system response and the original IVR system response. For example, the confidence scores of 100 for the first two tester input may indicate that the audio fingerprints matched 100% for the IVR system responses associated with these tester inputs (e.g., because the IVR responses shown in FIGS. 5A and 7B are the same for these tester inputs). The confidence score of 95 for the third tester input may indicate that the audio fingerprints matched 95% for the IVR system responses associated with the third tester input (e.g., because the IVR responses shown in FIGS. 5A and 7B are mostly the same, with a difference of $300 vs. $100). The confidence score of 53 for the fourth tester input may indicate that the audio fingerprints matched 53% for the IVR system responses associated with the fourth tester input (e.g., because the IVR responses shown in FIGS. 5A and 7B are very different, "Main menu" vs. "Thanks for calling. Goodbye!"). In some implementations, IVR testing device 250 may determine the test status based on the confidence score. For the purpose of FIG. 7C, assume that confidence scores above 90 indicates that a test passed, and a confidence score of 90 or below indicates that a test failed. In some implementations, IVR testing device 250 may generate a textual report that identifies, in text, the differences between the audio information for an original IVR system response and a new IVR system response (e.g., the difference of $300 vs. $100, the difference of "Main menu" vs. "Thanks for calling. Goodbye!", etc.).

As shown by reference numbers 780 and 785, the user interface may provide an input mechanism for the tester to cause tester input device 210 to play an audio file associated with the original IVR system response or the new IVR system response. In this way, the tester may compare IVR system responses, and may identify problems with IVR system 240 to be solved before IVR system 240 and/or an update to IVR system 240 is deployed.

As indicated above, FIGS. 7A-7C are provided merely as an example. Other examples are possible and may differ from what was described with regard to FIGS. 7A-7C.

Implementations described herein assist in automated testing of IVR systems, including validating IVR responses and end-to-end call flows.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
identify a first tester input associated with a first call to be tested for an interactive voice response system, the first tester input including input provided to the interactive voice response system;
identify a first response associated with the first call, the first response including a response provided by the interactive voice response system, on the first call, based on the first tester input;
initiate a second call with the interactive voice response system to cause the first tester input to be provided to the interactive voice response system, the second call being initiated after the first call, the second call causing a second response to be received from the interactive voice response system;
compare first audio information, associated with the first response, and second audio information associated with the second response;
determine a first test result based on comparing the first audio information and the second audio information;
provide information that identifies the first test result;
identify a second tester input associated with the second call, the second tester input being different from the first tester input;
receive a third response from the interactive voice response system, on the first call, based on the second tester input;
receive a fourth response from the interactive voice response system, on the second call, based on the second tester input;
compare third audio information, associated with the third response, and fourth audio information associated with the fourth response;
determine a second test result based on comparing the third audio information and the fourth audio information; and
provide information that identifies the second test result.

2. The device of claim 1, where the one or more processors, when initiating the second call, are to:
initiate the second call between a session initiation protocol phone device and the interactive voice response system,
the second call being conducted using session initiation protocol.

3. The device of claim 1, where the one or more processors, when determining the first test result, are to:
determine a degree to which the first audio information matches the second audio information based on comparing the first audio information and the second audio information; and
where the one or more processors, when providing the information that identifies the first test result, are to:
provide information that identifies the degree to which the first audio information matches the second audio information.

4. The device of claim 1, where the first audio information include a first audio fingerprint of the first response;
where the second audio information includes a second audio fingerprint of the second response;
where the one or more processors, when comparing the first audio information and the second audio information, are to:
compare the first audio fingerprint and the second audio fingerprint; and
where the one or more processors, when determining the first test result, are to:
determine the first test result based on comparing the first audio fingerprint and the second audio fingerprint.

5. The device of claim 4, where the one or more processors, when determining the first test result, are to:
determine a degree to which the first audio fingerprint and the second audio fingerprint match; and
where the one or more processors, when providing the information that identifies the first test result, are to:
provide information that identifies the degree to which the first audio fingerprint and the second audio fingerprint match.

6. The device of claim 1, where the one or more processors are further to:
receive a call flow identifier that identifies a call flow associated with the first call;
identify an input associated with the call flow based on the call flow identifier; and
where the one or more processors, when identifying the first response associated with the first call, are to:
identify the first response based on the input.

7. The device of claim 1, where the one or more processors, when determining the first test result, are to:
determine whether a test of the first call passed or failed based on comparing the first audio information and the second audio information; and
where the one or more processors, when providing the information that identifies the first test result, are to:
provide information that indicates whether the test of the first call passed or failed based on determining whether the test of the first call passed or failed.

8. A non-transitory computer-readable medium storing instructions, the instructions comprising:
one or more instructions that, when executed by one or more processors, cause the one or more processors to:
identify a first tester input associated with a first call to be tested for an interactive voice response (IVR) system,
the first tester input including input provided to the IVR system;
identify a first IVR system response associated with the first call,
the first IVR system response including a response provided by the IVR system, on the first call, based on the first tester input;
initiate a second call with the IVR system to cause the first tester input to be provided to the IVR system, the second call being initiated after the first call, the second call causing a second IVR system response to be received from the IVR system;

compare first audio information, associated with the first IVR system response, and second audio information associated with the second IVR system response;
determine a first test result based on comparing the first audio information and the second audio information;
provide information that identifies the first test result;
identify a second tester input associated with the second call,
the second tester input being different from the first tester input;
receive a third IVR system response from the IVR system, on the first call, based on the second tester input;
receive a fourth IVR system response from the IVR system, on the second call, based on the second tester input;
compare third audio information, associated with the third IVR system response, and fourth audio information associated with the fourth IVR system response;
determine a second test result based on comparing the third audio information and the fourth audio information; and
provide information that identifies the second test result.

9. The non-transitory computer-readable medium of claim 8, where the one or more instructions, that cause the one or more processors to initiate the second call, cause the one or more processors to:
initiate the second call between a session initiation protocol (SIP) phone device and the IVR system.

10. The non-transitory computer-readable medium of claim 8, where the one or more instructions, when executed by the one or more processors, further cause the one or more processors to:
receive an indication that the first call has been initiated;
monitor the first call to determine the first tester input and the first IVR system response;
store the first tester input and the first IVR system response;
where the one or more instructions, that cause the one or more processors to identify the first tester input, cause the one or more processors to:
identify the first tester input based on storing the first tester input; and
where the one or more instructions, that cause the one or more processors to identify the first IVR system response, cause the one or more processors to:
identify the first IVR system response based on storing the first IVR system response.

11. The non-transitory computer-readable medium of claim 8, where the one or more instructions, that cause the one or more processors to determine the first test result, cause the one or more processors to:
determine a percentage of the second audio information that matches the first audio information based on comparing the first audio information and the second audio information; and
where the one or more instructions, that cause the one or more processors to provide the information that identifies the first test result, cause the one or more processors to:
provide information that identifies the percentage of the second audio information that matches the first audio information.

12. The non-transitory computer-readable medium of claim 8, where the one or more instructions, when executed by the one or more processors, further cause the one or more processors to:
generate a first audio fingerprint based on the first IVR system response;
generate a second audio fingerprint based on the second IVR system response;
where the one or more instructions, that cause the one or more processors to compare the first audio information and the second audio information, cause the one or more processors to:
compare the first audio fingerprint and the second audio fingerprint; and
where the one or more instructions, that cause the one or more processors to determine the first test result, cause the one or more processors to:
determine the first test result based on comparing the first audio fingerprint and the second audio fingerprint.

13. The non-transitory computer-readable medium of claim 12, where the one or more instructions, that cause the one or more processors to determine the first test result, cause the one or more processors to:
determine a degree to which the first audio fingerprint and the second audio fingerprint match; and
where the one or more instructions, that cause the one or more processors to provide the information that identifies the first test result, cause the one or more processors to:
provide information that identifies the degree to which the first audio fingerprint and the second audio fingerprint match.

14. The non-transitory computer-readable medium of claim 8, where the one or more instructions, when executed by the one or more processors, further cause the one or more processors to:
receive a call flow identifier that identifies a call flow associated with the first call;
identify an input associated with the call flow based on the call flow identifier; and
where the one or more instructions, that cause the one or more processors to identify the first IVR system response associated with the first call, are to:
identify the first IVR system response based on the input.

15. A method, comprising:
identifying, by one or more devices, a first tester input associated with a first call to be tested for an interactive voice response (IVR) system,
the first tester input including input provided to the IVR system;
identifying, by the one or more devices, a first IVR system response associated with the first call,
the first IVR system response being received from the IVR system, on the first call, based on the first tester input;
initiating, by the one or more devices, a second call with the IVR system to cause the first tester input to be provided to the IVR system,
the second call being initiated after the first call;
receiving, by the one or more devices and from the IVR system, a second IVR system response based on initiating the second call;

comparing, by the one or more devices, first audio information, associated with the first IVR system response, and second audio information associated with the second IVR system response;
determining, by the one or more devices, a first test result based on comparing the first audio information and the second audio information;
providing, by the one or more devices, information that identifies the first test result;
identifying, by the one or more devices, a second tester input associated with the second call,
the second tester input being different from the first tester input;
receiving, by the one or more devices, a third IVR system response from the IVR system, on the first call, based on the second tester input;
receiving, by the one or more devices, a fourth IVR system response from the IVR system, on the second call, based on the second tester input;
comparing, by the one or more devices, third audio information, associated with the third IVR system response, and fourth audio information associated with the fourth IVR system response;
determining, by the one or more devices, a second test result based on comparing the third audio information and the fourth audio information; and
providing, by the one or more devices, information that identifies the second test result.

16. The method of claim 15, where initiating the second call with the IVR system comprises:
initiating the second call with the IVR system using a session initiation protocol.

17. The method of claim 15, where receiving the second IVR system response comprises:
receiving the first tester input using a session initiation protocol.

18. The method of claim 15, further comprising:
recording the second IVR system response; and
determining the second audio information based on recording the second IVR system response.

19. The method of claim 15, where determining the test first result comprises:
quantifying a difference between the first audio information and the second audio information based on comparing the first audio information and the second audio information; and
where providing the information that identifies the first test result comprises:
providing information that identifies the quantified difference.

20. The method of claim 15, where the first audio information includes a first audio fingerprint of the first IVR system response;
where the second audio information includes a second audio fingerprint of the second IVR system response;
where comparing the first audio information and the second audio information comprises:
comparing the first audio fingerprint and the second audio fingerprint;

where determining the first test result comprises:
determining a percentage of the second audio fingerprint that matches the first audio fingerprint; and
where providing the information that identifies the first test result comprises:
providing information that identifies the percentage of the second audio fingerprint that matches the first audio fingerprint.

21. A method, comprising:
identifying, by one or more devices, a plurality of first tester inputs associated with a first call to be tested for an interactive voice response (IVR) system,
the plurality of first tester inputs including inputs provided to the IVR system;
identifying, by the one or more devices, a plurality of first IVR system responses,
the plurality of first IVR system responses being received from the IVR system, on the first call, based on the plurality of first tester inputs;
initiating, by the one or more devices, a second call with the IVR system to cause the plurality of first tester inputs to be provided to the IVR system,
the second call being initiated after the first call;
receiving, by the one or more devices and from the IVR system, a plurality of second IVR system responses based on providing the plurality of first tester inputs on the second call;
comparing, by the one or more devices, first audio information, associated with the plurality of first IVR system responses, and second audio information associated with the plurality of second IVR system responses;
determining, by the one or more devices, a first test result based on comparing the first audio information and the second audio information;
providing, by the one or more devices, information that identifies the first test result;
identifying, by the one or more devices, a plurality of second tester inputs associated with the second call,
the plurality of second tester inputs being different from the plurality of first tester inputs;
receiving, by the one or more devices, a plurality of third IVR system responses from the IVR system, on the first call, based on the plurality of second tester inputs;
receiving, by the one or more devices, a plurality of fourth IVR system responses from the IVR system, on the second call, based on the plurality of second tester inputs;
comparing, by the one or more devices, third audio information, associated with the plurality of third IVR system responses, and fourth audio information associated with the plurality of fourth IVR system responses;
determining, by the one or more devices, a second test result based on comparing the third audio information and the fourth audio information; and
providing, by the one or more devices, information that identifies the second test result.

* * * * *